June 27, 1961 C. L. G. BENARD 2,990,469
LIGHTING DEVICE EMBEDDED IN THE GROUND, IN
PARTICULAR FOR AIRFIELDS
Filed March 3, 1959 3 Sheets-Sheet 1

INVENTOR
CHRISTIAN L.G. BENARD

June 27, 1961  C. L. G. BENARD  2,990,469
LIGHTING DEVICE EMBEDDED IN THE GROUND, IN
PARTICULAR FOR AIRFIELDS
Filed March 3, 1959 3 Sheets-Sheet 2
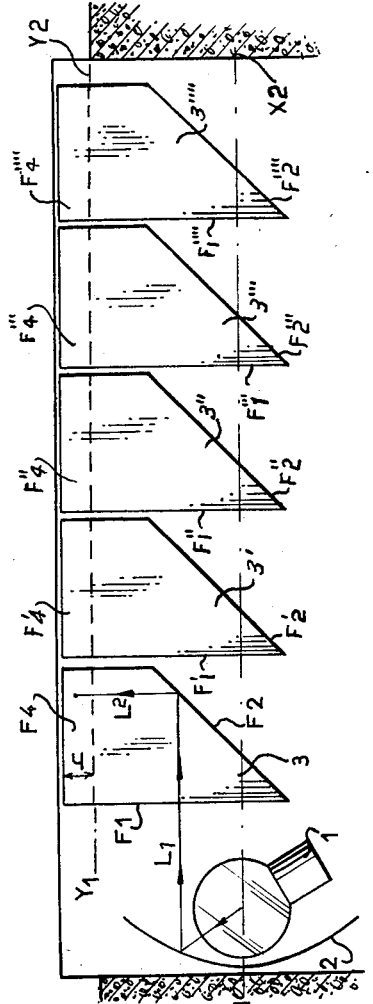
FIG.2
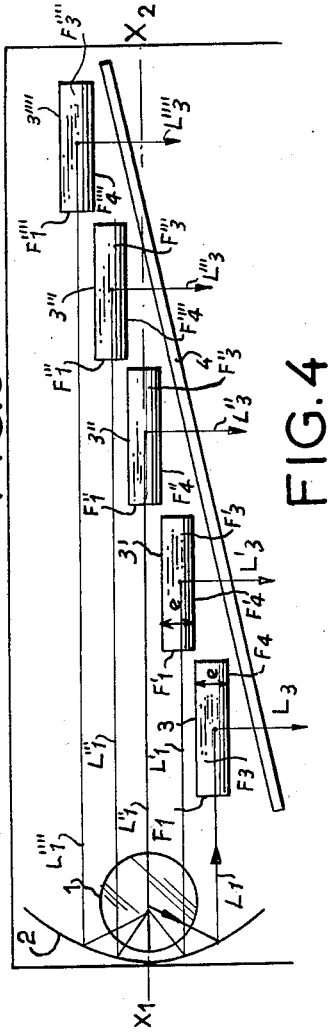
FIG.3
FIG.4
INVENTOR
CHRISTIAN L.G. BENARD June 27, 1961  C. L. G. BENARD  2,990,469
LIGHTING DEVICE EMBEDDED IN THE GROUND, IN
PARTICULAR FOR AIRFIELDS
Filed March 3, 1959  3 Sheets-Sheet 3
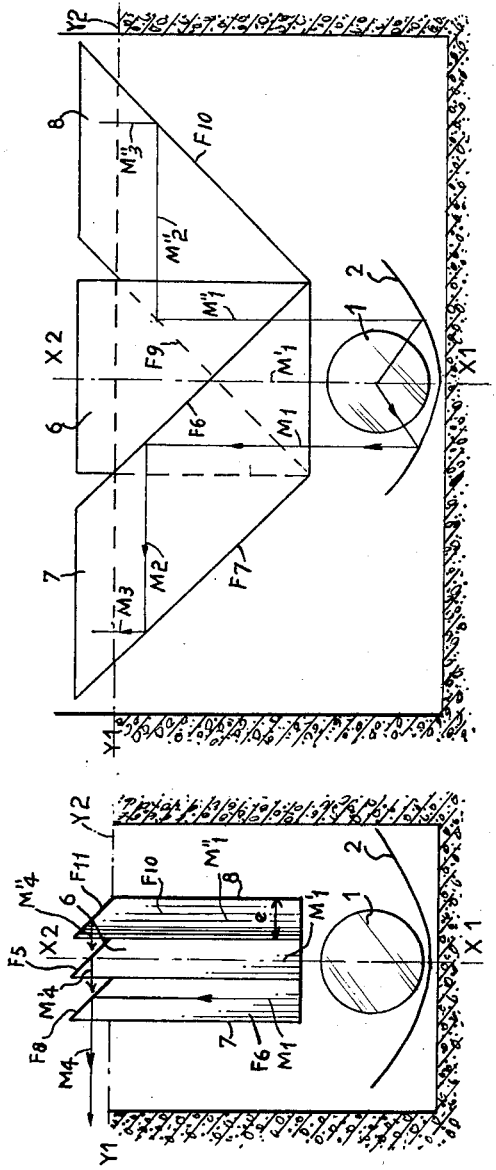
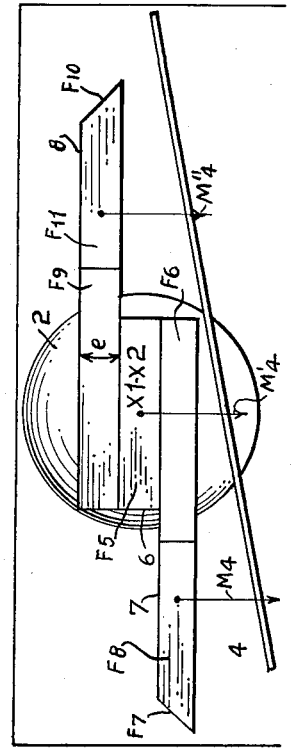
INVENTOR
CHRISTIAN L. G. BENARD

United States Patent Office 2,990,469
Patented June 27, 1961

2,990,469
LIGHTING DEVICE EMBEDDED IN THE GROUND, IN PARTICULAR FOR AIRFIELDS
Christian Louis Georges Benard, Paris, France, assignor to Anciens Etablissements Barbier-Benard & Turenne, Paris, France, a French joint-stock company
Filed Mar. 3, 1959, Ser. No. 796,931
5 Claims. (Cl. 240—1.2)

The present invention relates to a lighting device, particularly adapted to airfields, providing a very dense beam of light, the main characteristics of which are its very high intensity at a very low angle of elevation and the fact that it projects only very slightly (a maximum of 3 cms.) above the ground.

Contrary to the known lighting devices, the present device does not require the airfield to be provided with a large pit, a grid, a well, nor any external mechanical or electrical means. It is sunk into the ground and the only part remaining above ground consists of a projection transverse to the runway which is fairly long, but so slight that an aircraft which may be rolling thereover cannot suffer any detrimental effects.

The greater part of the vertical side of this projection is made of a transparent material (e.g. glass), through which emerges a low angle light beam having the desired photometric distribution.

More specifically, the present invention relates to an optical device embedded in the ground, designed mainly for the lighting of airfields, essentially comprising, on the one hand, an optical system giving out a beam of parallel rays (such as a parabolic mirror having a light source located at the focus thereof) and, on the other hand, a series of truncated prisms receiving said parallel rays perpendicular to their inlet face and grouped so as to receive the total beam, each of said prisms transmitting after one or more total reflections a beam emerging in the form of nearly parallel rays having its cross-section in the form of an elemental rectangle, the very low height of which is equal to the thickness of the prism, the group of beams emerging from the combined prisms having their combined cross-section in the form of an elongated rectangle comprising the various elemental rectangles juxtaposed by their short sides.

The device according to the invention is sunk into the ground and only projects by the height of the beam being given out.

According to an advantageous embodiment, the optical system gives out a beam of parallel horizontal rays, which when the device is used on an airfield are perpendicular to the length of the airfield and penetrate into the truncated prisms through their side faces, and said truncated prisms transmit, after two total reflections, a beam emerging parallel to the length of the airfield.

According to a further embodiment, the optical system gives out a beam of parallel vertical rays, which penetrate into the truncated prisms through their lower face, and said truncated prisms transmit, after one or three total reflections, a beam emerging parallel to the length of the airfield.

Other features and advantages of the present invention will become clear on reading the following description, with reference to the accompanying drawings, given by way of explanation and without limiting the scope of the invention, of three main embodiments of the lighting device in accordance with the invention. In these drawings:

FIG. 2 is an end view of one embodiment of the device according to the invention, corresponding to the case in which the optical system gives out an incident beam of horizontal rays which, when said device is used on an airfield, are perpendicular to the length of the field and in which the rays are submitted in the truncated prisms to two total reflections.

FIG. 3 is a side view of the same embodiment as in FIG. 2.

FIG. 4 is a plan view view of the same embodiment as in FIGURES 2 and 3.

FIGURE 5 is an end view of a second embodiment of the device according to the invention, corresponding to the case in which the optical system gives out an incident vertical beam, and in which the rays are subjected in the truncated prisms to one total reflection in the middle prism, and to three total reflections in the other two prisms.

FIGURE 6 is a side view of the same embodiment as in FIGURE 5.

FIGURE 7 is a plan view of the same embodiment as in FIGURES 5 and 6.

Figure 8:
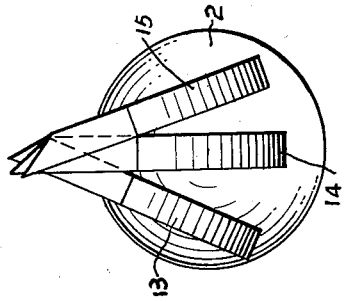
FIGURE 8 is an end view of a further arrangement of the truncated prisms.

Referring to FIGURES 2, 3 and 4, a light source constituted by an incandescent lamp 1 is placed so as to have the centre of its filament located at the focal point of a parabolic mirror 2, the horizontal axis of which is perpendicular to the length of the runway of the airfield. The mirror 2 and the lamp-filament are so dimensioned that the divergence of the beam reflected from the mirror is comparable to the smallest of the divergences required for the outer beam. The beam reflected from the mirror 2 then simultaneously meets several truncated prisms 3, 3', 3'', 3''', 3'''' which are all identical. Considering prism 3 for instance, a light ray L reflected as $L_1$ from the mirror 2 parallel to its axis $X_1X_2$ first meets prism face $F_1$ which is vertical and normal to the axis $X_1X_2$ of the mirror and thus penetrates into the prism without being refracted; then, it is refracted by a second face $F_2$ of the prism, which makes a dihedral angle of 45° with $F_1$. The ray $L_1$ thus becomes vertical ray $L_2$ and is again reflected by a third face $F_3$ of the prism, which also forms an angle of 45° to the vertical and becomes ray $L_3$, but since in the plane of face $F_3$ horizontal lines are parallel to the axis $X_1X_2$ of the mirror, it follows that ray $L_3$ is horizontal and perpendicular to the rays $L_1$ penetrating into the prism through face $F_1$, and therefore parallel to the length of the runway, having thus, since it was reflected by mirror 2, light has followed three rectangular paths in space. Ray $L_3$ then passes through, and at a normal to, the outlet face $F_4$ of the prism (which is normal to the length of the runway) without being refracted and, finally, through a parallel-faced strip or pane 4 positioned flush with the ground, in front of the outlet faces of the prisms. All the prisms have the same thickness in the direction of the rays through the outlet face. The explanations provided in the above paragraph apply to each of the prisms, it being only necessary to add one, two, three or four dashes to each of the numerals used, according to the prism involved."

If, in the incident beam reflected from the mirror, only the rays reflected parallel to its axis $X_1X_2$ are to be considered, it can be seen that each of the above prisms intercepts a portion of this beam which is between two vertical parallel planes, and transmits this vertical slice, so that, prior to passing into the open through the prism outlet face, said slice becomes a horizontal slice, the cross-section of which is in the form of an elemental rectangle. Owing to the offsetting of the prisms, shown in the plan view of FIGURE 4, all the rectangular horizontal slices transmitted by the various prisms are placed side by side, and this results in the cross-section of the total beam given out appearing substantially as an elongated rectangle with its lower side located flush with the ground and having its height substantially equal to the thickness $e$ of each prism (FIGURES 2 and 4).

As to the light rays reflected from the mirror which are not parallel to the axis $X_1X_2$ (they all make a small angle with this axis), their relative position at the outlet of the prisms has not substantially varied in relation to the position which they occupied at the inlet into the prisms. Besides, if a limited amount of these rays are subjected to one or more total reflections by the inner walls of the prisms, there is substantially no resulting loss of flux.

Figure 1:
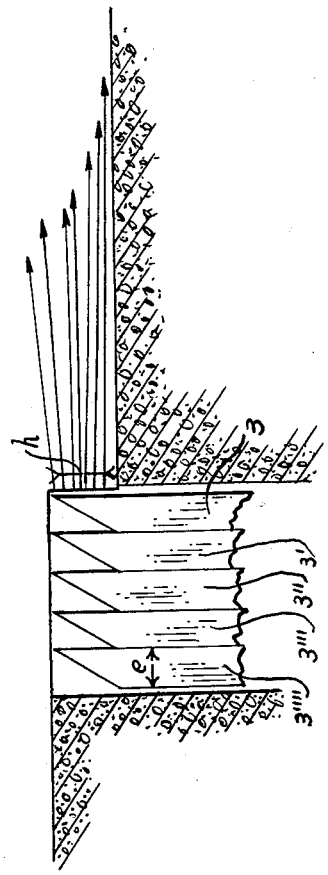
FIGURE 1 is a diagrammatic side view of the portion of the device projecting above the ground and of the emerging low angle light beam.

It is essential to point out that the height of the projection $h$ of the prisms above the level $Y_1Y_2$ of the runway (FIGS. 3 and 1), which determines the total projecting height of the complete unit, is proportional to the thickness $e$ of the prisms and that the number of the prisms is obviously inversely proportional to said thickness.

By coupling several identical optical systems formed in this manner transversely relative to the length of the runway, the projection $h$ can be further reduced, while the light intensity or the divergency of the beam given out is increased.

The optical systems (or the transverse assemblies thus formed) can even be arranged in an offset relationship, this time longitudinally in relation to the runway, this offsetting being such that an observer viewing from the lowest position of the required beam will see the two or more thus-formed transverse light-bars with a very slight angular displacement in an almost overlapping relationship. It will be appreciated that the rotation of any prism of FIGURES 2, 3 and 4 about an axis parallel to the axis $X_1X_2$ of the mirror corresponds to a variation in the elevation of the beam given out through said prism, whereas a rotation of this prism about a horizontal axis perpendicular to $X_1X_2$ of the mirror corresponds to a shift in azimuth of this beam. Therefore, each prism of the device shown in FIGURES 2, 3 and 4 can become, if desired, a means for adjusting the emergent beam.

These adjustment means combined with a possible defocusing of the lamp with respect to the parabolic mirror or a rotation of said mirror with respect to said lamp make it possible to approach very close to the desired photometric distribution. This is made even easier since, for the high intensities usually required on runways, several devices identical to that described in FIGURE 2 and arranged transversely side-by-side on the ground will normally be necessary. These devices can be slightly angularly offset relative to one another, thus enabling a great flexibility of adjustment to be achieved.

The following device, enabling the distribution of the elemental beam given out by each of the prisms to be altered, can be substituted wholly or partially for the aforesaid adjustment means (or can be operated additionally therewith).

The outlet surface of all or of some prisms (i.e. $F_4$ to $F_4''''$) instead of being plane and both vertical and parallel to the axis $X_1X_2$ of the mirror as shown in FIGURE 2, can be either (1) a plane face inclined to the vertical or to the axis $X_1X_2$, or (2) of spherical or otherwise curved section, adapted to offset (first case) the elemental beam (either in the vertical plane or in the horizontal plane), or to diffuse (second case) said elemental beam (either in the vertical plane or in the horizontal plane).

Figure 9:
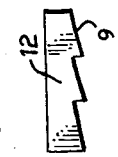
FIGURE 9 shows an embodiment of the prism-face transmitting the low angle beam.
Figure 10:
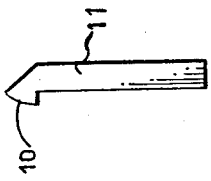
FIGURE 10 shows another embodiment of the prism-face transmitting the low angle beam.

The thus modified outlet face of the prism (referred to as 12) is shown at 9 (FIG. 9) in the case of an offsetting in azimuth, and at 10 (FIG. 10, wherein the prism is referred to as 11), in the case of a diffusion in elevation. In FIGURE 9, the prism is shown in plan view like prisms in FIG. 4; and in FIG. 10, the prism is shown like prisms in FIG. 2.

Figure 11:
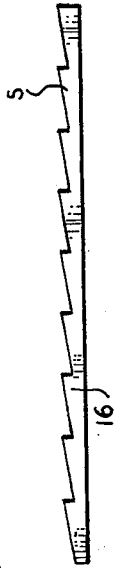
FIGURE 11 is an end view of an alternative form of the transparent strip or pane having the beam passing therethrough prior to lighting the ground of the airfield.

The desired distribution of light on the runway can likewise be obtained by replacing the parallel-faced strip or pane 4 positioned flush with the ground at the outlet of the emerging rays, with a diverging pane 16 comprising refracting prisms 5 (FIGURE 11) or diverging lenticles enabling the beam given out to be rectified either in elevation or in azimuth. Such a diverging pane can be used in place of the aforesaid adjustment means or in conjunction therewith.

In the alternative embodiment of the device according to the invention shown in FIGURES 5, 6 and 7, the lamp-and-mirror assembly is identical to that shown in FIGURES 2, 3 and 4, except that the axis $X_1X_2$ of the mirror is no longer horizontal but vertical. The truncated prisms, three for example, perform a similar function to that of prisms 3 to 3'''' in FIGURE 3, but one of them, the central prism 6, only subjects the rays to a single 45° reflection, while the other two prisms (7 and 8) subject them to three reflections, each at 45°.

Most precisely, a vertical ray $M'_1$ is reflected as $M'_4$ by face $F_5$ of central prism 6; a vertical ray $M_1$ is successively reflected as $M_2$, $M_3$, $M_4$ by faces $F_6$, $F_7$ and $F_8$ of prism 7; and a vertical ray $M''_1$ is successively reflected as $M''_2$, $M''_3$, $M''_4$ by faces $F_9$, $F_{10}$ and $F_{11}$ of prism 8. It is to be understood that in FIGURE 5, face $F_6$ of prism 7 is inclined backwards at a 45° angle with the plane of the figure; similarly, in FIGURE 5, face $F_{10}$ of prism 8 is inclined forwards at 45° angle with the plane of the figure. In addition, faces $F_8$, $F_5$ and $F_{11}$ are all at a 45° angle with the horizontal.

With this type of device, a beam of horizontal rays given out parallel to the length of the runway is still obtained, and the cross-section of this beam is still an elongated rectangle of a low height substantially equal to the thickness $e$ of the prisms.

In accordance with a further embodiment shown in FIGURE 8 which is a simple variation of the device shown in FIGURES 2, 3 and 4, the prisms referred to as 13, 14, 15 instead of being all vertical as shown in FIGURE 2, are inclined, their inlet face being however still perpendicular to the incident beam of rays given out by the optical system. Such an arrangement is advantageous if the outlet faces of the prisms are required to be in the same alignment instead of being offset with respect to the direction of the length of the runway, as in the case depicted in FIGURE 4.

It is to be understood that this invention has just been described by way of an explanation without limitation of the same and that various alterations of detail can be made therein without falling outside its scope.

In particular, the mirror 2 can have a non-parabolic shape and the truncated prisms can have a shape different to that described, the essential feature being that they transmit and give out a beam of a very low height, which, when the device according to the invention is used for lighting an airfield, is parallel to the length of the runway.

I claim:
1. A lighting system partially embedded in the ground and projecting only very slightly above the ground comprising a subsurface source of light adapted to give out a beam of parallel rays; a series of truncated prisms in adjacent but staggered relationship, each of said prisms having an inlet face receiving said parallel rays at a normal thereto; at least one light direction changing face adapted to receive said parallel rays at an angle of 45° and to totally reflect same, the last of said at least one direction changing faces, as counted in the direction of the paths of said rays being just above the ground, and an outlet face similarly just above the ground, at a 45° angle to said last light direction changing face, said outlet face being adapted to receive said totally reflected rays and to transmit a beam emerging as nearly parallel rays; all of said truncated prisms being of the same thickness in the direction of the emerging beams, said outlet face being rectangular, whereby the cross-section of each of said emerging beams is in the form of an elemental rectangle the very low height of which is substantially equal to said thickness, all such elemental rectangles, because of the adjacency of the prisms of the series, together assuming the form of an elongated rectangle located with its lower side flush with the ground.

2. Lighting device according to claim 1, wherein each prism of the series of truncated prisms is capable of rotating about an axis parallel to the beam of rays given out by the optical system, whereby each of said prisms can become a means for adjusting the emerging beam.

3. Lighting device according to claim 1, wherein each prism of the series of truncated prisms is capable of rotating about an axis perpendicular to the beam of rays given out by the optical system, whereby each of said prisms can become a means for adjusting the emerging beam.

4. A lighting system embedded in the ground and projecting only very slightly above the ground; comprising a subsurface source of light adapted to give out a beam of horizontal parallel rays; a series of truncated prisms in adjacent but staggered relationship; each of said prisms having a vertical inlet face receiving said horizontal parallel rays at a normal thereto; a first light direction changing face at 45° angle to said vertical inlet face and adapted to receive said parallel rays at an angle of 45° and to reflect same vertically; a second direction changing face located just above the ground, at a right angle to said outlet face, and adapted to receive said vertically reflected rays at an angle of 45° and to reflect same in a horizontal direction at a right angle with the rays received by said inlet face, and an outlet face similarly just above the ground, at a 45° angle to said second face, said outlet face being adapted to receive said horizontally reflected rays at a normal thereto and to transmit a beam emerging as parallel rays, all of said truncated prisms being of the same thickness in the direction of the emerging beams, said outlet face being rectangular, whereby the cross-section of each of said transmitted beams is in the form of an elemental rectangle the very low height of which is equal to said thickness, all such elemental rectangles being juxtaposed whereby to form an elongated rectangle located with its lower side flush with the ground.

5. A lighting system embedded in the ground and projecting only very slightly above the ground, comprising a subsurface source of light adapted to give out a beam of vertical parallel rays; a series of truncated prisms in adjacent but staggered relationship; one of said truncated prisms having a horizontal inlet face receiving said vertical parallel rays at a normal thereto, one direction changing face located just above the ground, at a 45° angle to said inlet face and adapted to receive said vertical parallel rays at an angle of 45° and to totally reflect same in a horizontal direction, and an outlet face similarly just above the ground, at a 45° angle to said direction changing face, and adapted to receive said horizontally reflected rays at a normal thereto and to transmit a beam emerging as parallel rays; in each of the other of said truncated prisms, a horizontal inlet face receiving said vertical parallel rays at a normal thereto, a first direction changing face at a 45° angle to said inlet face and adapted to receive said vertical parallel rays at an angle of 45° and to reflect same horizontally, a second direction changing face parallel to said first direction changing face and adapted to receive said horizontally reflected rays at an angle of 45° and to reflect same vertically, a third direction changing face located just above the ground and adapted to receive said vertically reflected rays at an angle of 45° and to reflect same in a horizontal direction at a right angle with the rays received by said inlet face, and an outlet face similarly just above the ground, at a right angle to said third face and adapted to receive said horizontally reflected rays at a normal thereto and to transmit a beam emerging as parallel rays; all of said truncated prisms being of the same thickness in the direction of the emerging beams, said outlet face being rectangular, whereby the cross-section of each of said transmitted beams is in the form of an elemental rectangle the very low height of which is equal to said thickness, all such elemental rectangles because of the adjacency of the prisms of the series, together assuming the form of an elongated rectangle located with its lower side flush with the ground.

References Cited in the file of this patent

UNITED STATES PATENTS

| | | |
|---|---|---|
| 1,817,827 | Kolar | Aug. 4, 1931 |
| 2,475,256 | Saint | July 5, 1949 |
| 2,480,178 | Zinberg | Aug. 30, 1949 |
| 2,689,298 | Gretener | Sept. 14, 1954 |
| 2,827,561 | Kennedy | Mar. 18, 1958 |

FOREIGN PATENTS

| | | |
|---|---|---|
| 157,538 | Great Britain | Jan. 17, 1921 |

OTHER REFERENCES

The Pearson article, "Piping Light With Acrylic Materials," by H. Pearson reprinted from the August 1946 Modern Plastics Monthly, pages 123–127, by Henry Pearson—Laboratory, Rohm & Haas Co., Philadelphia, Pa. (The reprint includes one additional page not originally published.)